United States Patent [19]

Saidi et al.

[11] Patent Number: 5,566,001
[45] Date of Patent: Oct. 15, 1996

[54] METHOD AND APPARATUS FOR FAX MESSAGING IN A SELECTIVE CALL RECEIVER SYSTEM USING MULTIPLE CODE-BOOK DATA COMPRESSION

[75] Inventors: Ali Saidi, Boynton Beach; Zaffer Merchant, Lantana; Leon Jasinski, Ft. Lauderdale, all of Fla.

[73] Assignee: Motorola, Inc., Schaumburg, Ill.

[21] Appl. No.: 286,713

[22] Filed: Jul. 27, 1994

[51] Int. Cl.⁶ .................................................. H04N 1/41
[52] U.S. Cl. .................... 358/426; 358/427; 358/433; 340/825.44; 382/232; 382/246; 382/173
[58] Field of Search ............................... 358/426, 432, 358/433, 261.3, 430, 428, 261.2; 348/390, 409, 420, 403, 404; 340/525.44; 379/58, 59; 455/38.4; 382/232, 245, 246, 173

[56] References Cited

U.S. PATENT DOCUMENTS

| | | | |
|---|---|---|---|
| 4,897,733 | 1/1990 | Sakaguchi et al. | 358/433 |
| 4,920,427 | 4/1990 | Hirata | 358/437 |
| 4,933,770 | 6/1990 | DeSpain | 358/434 |
| 5,309,526 | 5/1994 | Pappas et al. | 358/430 |
| 5,420,692 | 5/1995 | Lin et al. | 358/426 |

*Primary Examiner*—Edward L. Coles, Sr.
*Assistant Examiner*—Thomas D. Lee
*Attorney, Agent, or Firm*—D. Andrew Floam

[57] ABSTRACT

A fax selective call receiver system (10) featuring compression of a fax message with an optimal one of a plurality of compression code-books (50). At least a portion (44) of a source document (26) is compressed with each of a plurality of code-books (50) and the smallest resulting data file is selected as the optimal compressed file. The compressed data file is transmitted to a selective call receiver (40) together with an index identifying the optimal code-book. The selective call receiver (40) stores each of the plurality of code-books and accesses the particular code-book for decompressing the data file on the basis of the received index. In an alternative embodiment, the fax message is divided into composing segments (SI1, SI2 and SI3) and each segment is compressed with each code-book to determine the optimal code-book for each segment.

14 Claims, 8 Drawing Sheets

METHOD AND APPARATUS FOR FAX MESSAGING IN A SELECTIVE CALL RECEIVER SYSTEM USING MULTIPLE CODE-BOOK DATA COMPRESSION

FIELD OF THE INVENTION

This invention relates in general to facsimile communications and more specifically to a method and apparatus for providing facsimile communication with selective call receivers.

BACKGROUND OF THE INVENTION

Contemporary selective call receiver communication systems employ messaging schemes that can deliver voice, numeric, or alphanumeric messages to its user. The majority of selective call systems transmit address and message information using a protocol such as GSC (Motorola's Golay Sequential Code) or POCSAG (Great Britain's Post Office Code Standardisation Advisory Group).

When a user desires to transmit drawings, symbols or complex graphic-type information, existing selective call messaging (paging) systems and data transport protocols do not gracefully allow for the transmission of either long textual messages or messages containing graphical data. This is because selective call receivers are powered by limited energy content battery supplies that are quickly degraded when receiving and displaying long messages. In addition, because of the miniature size of the selective call receiver and its display, the information received is not easily readable and accessible to the user.

Thus, specialized techniques are necessary to transmit drawings and other more complex information to a selective call receiver. A facsimile message is an example of such complex information. However, transmitting a facsimile message to a selective call receiver has many advantages, one advantage being that the data file representative of the image is compressed, reducing the amount of air-time to transmit the message to a selective call receiver. For simplicity, the term "facsimile selective call receiver system" is used hereinafter to refer to a system for transmitting a facsimile to a selective call receiver.

Data compression in a facsimile selective call receiver (SCR) system involves computing the black and white run-lengths of the bi-level images followed by coding the run-lengths using the well known Huffman coding techniques. Huffman coding the run-lengths requires designing a Huffman code-book based on the estimated probability of the run-lengths. Huffman coding is optimal when the probabilities of the run-lengths are exact. However, the run-length probabilities vary for different types of images. Therefore, it is not possible to design a Huffman codebook which is close to optimum for different types of images with different resolutions.

Consequently, a more robust data compression and decompression system is needed in a facsimile SCR system to account for different types of images, while keeping the size of the compressed data file representative of the image as small as possible, ultimately to minimize air-time when wirelessly transmitting the facsimile message to a selective call receiver. Moreover, there is room for improvement in a facsimile SCR system, where the size of the display of a portable selective call receiver is presently small, and the size of the fax message image is also generally small.

SUMMARY OF THE INVENTION

Briefly, according to the invention, there is provided a fax SCR system featuring optimal image compression and decompression to minimize the amount of data needed for wireless (radio frequency) transmission from a selective call terminal to a selective call receiver. Specifically, an image representative of a source document, or at least a portion thereof, is compressed at the selective call terminal using each of a plurality of Huffman code-books. The code-books that are used are designed to be optimal for the types of images typically sent to a selective call receiver on the basis of training data collected from tests of several types of source documents. Each of the code-books is stored in the selective call receiver. The code-book that generates the smallest compressed file is chosen for compression, and the compressed file is transmitted to the selective call receiver, together with an index indicating the identity of the optimal code-book. The selective call receiver detects the index and decompresses the file using the appropriate code-book optimal for that image.

Thus, according to one aspect of the present invention, a method is provided for compressing a fax message and transmitting the message to a selective call receiver where the compressed fax message is decompressed for output, the method comprising steps of:

compressing at least a portion of the fax message with each of a plurality of different code-books;

determining a best compression for said portion of the fax message from said plurality of different code-books;

transmitting to the selective call receiver at least a data file representing the best compression of said portion of the fax message together with an identifier which identifies the optimal code-book corresponding to the best compression;

receiving the data file at a selective call receiver;

identifying the code-book used to compress the data file on the basis of the identifier; and decompressing the data file with the code-book corresponding to the received identifier.

According to another aspect of the present invention, a selective call fax messaging system is provided comprising a plurality of fax selective call receivers, a selective call terminal for wirelessly transmitting selective call messages to the selective call receivers, message controller means for receiving fax messages from fax transmitting means, selective call processing means for generating selective call fax messages for transmission to at least one selective call receiver, the improvement wherein the selective call processing means comprises: means for storing a plurality of facsimile compression code-books; means for compressing at least a portion of the fax message with each of a plurality of codebooks; means for determining a best compression for the portion of the fax message from the plurality of codebooks; means for generating at least a data file representing the best compression of the portion of the fax message together with an identifier which identifies the optimal code-book corresponding to the best compression; the selective call receiver comprises: means for receiving the data file; means for identifying the code-book used to compress the data file; and means for decompressing the data file with the code-book corresponding to the received identifier.

In an alternative embodiment, the image of the source document is divided or segmented into segments or subimages. Each code-book is applied to each segment to determine the optimal code-book for each segment. The compressed data file for each segment is transmitted to the selective call receiver, together with the corresponding index indicating the optimal code-book. The selective call receiver builds the entire image by decompressing each segment with the appropriate code-book for each segment.

DESCRIPTION OF PREFERRED EMBODIMENTS

Figure 1:
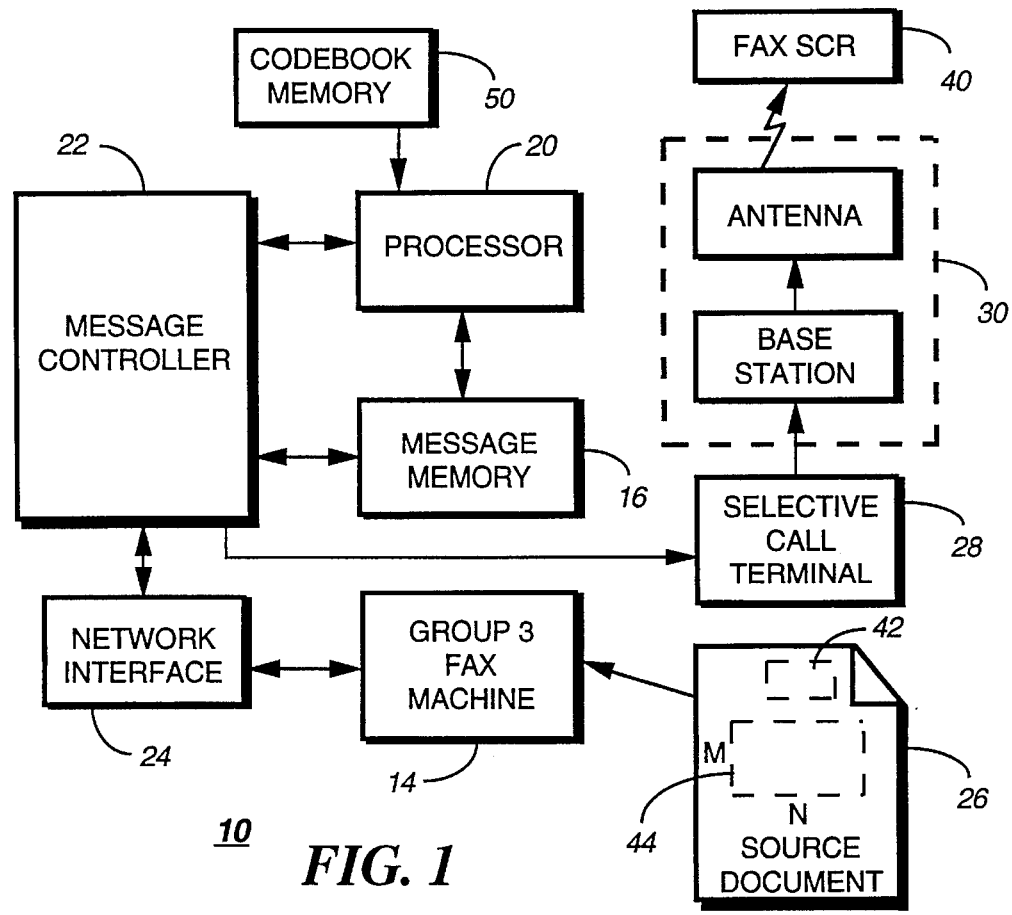
FIG. 1 is an electrical block diagram of a facsimile selective call receiver communication system in accordance with the preferred embodiment of the present invention.

Referring to FIG. 1, an electrical block diagram of a facsimile selective call receiver (SCR) communication system 10 is shown in accordance with the preferred embodiment of the present invention. Operationally, a user enters a source document 26 into a facsimile (fax) machine 14, the fax machine 14 reads (or scans) and quantizes the image (message or information) contained thereon. The fax machine 14 is coupled to a message controller 22 via a network interface 24 which is ultimately coupled to a selective call terminal 28. The network interface 24, well known to one of ordinary skill in the art, includes a Public Switch Telephone Network (PSTN) or an Integrated Service Digital Network (ISDN). It can also be appreciated by one of ordinary skill in the art that the fax machine 14 can be directly connected to the message controller 22 via a high speed network (e.g., RS232, IEEE 802.3) to achieve an extremely high speed message throughput. Therefore, the fax machine 14 need not be located at the same physical site as the selective call terminal 28. The fax machine 14 is also embodied, for example, as a computer with facsimile transmission software and a modem, a conventional document scanner, or possibly a dedicated message entry device, each capable of communicating with the message controller 22 via the network interface 24.

To send a fax to a subscriber (a person or device having a fax selective call receiver 40), the sender enters certain information in various regions of the document. To simplify the process of transmitting a fax message to a selective call receiver, the document is optionally preformatted into regions which are designated for certain types of information. For example, the subscriber's cap-code (address) and other system information is provided in one region 42 in such a manner making it easily recognizable, whereas a hand-written message or graphic information (drawing, graphs, etc.) is provided in region 44 of the source document 26. The image information contained in region 44 is of most importance in accordance with the present invention, and is therefore called the "main region". This is the primary image that ultimately is to be reproduced on a display of the selective call receiver 40 with the best possible accuracy and highest possible resolution.

Alternatively, the sender can send a fax, calling the subscriber's paging service provider using a conventional telephone to enter, for example, the user's cap-code number (a unique number assigned by the paging service provider that corresponds to the actual coded address of a selective call receiver) and other system information. The paging service provider maintains a list of fax capable cap-code numbers (addresses) and upon receiving the entered cap-code number, a procedure to receive a facsimile message is initiated. The source document 26 is then scanned into the fax machine 14. The processing of the information on the source document, such as hand written messages (text information) and graphic information in the region 44 involves encoding, compressing and transferring the information to the selective call terminal 28 which will produce a paging fax message that will be transmitted to the targeted subscriber. The method, protocol, and apparatus required for the transmission of the paging message will be further described below.

After the document has been entered into the fax machine 14, the entire source document 26 is scanned and quantized. Thereafter, the information is encoded and compressed in the fax machine preferably according to the Group III fax coding scheme which is well known to one of ordinary skill in the art. The Group III facsimile (fax) machine is defined under the CCITT (Consultative Committee on International Telegraph and Telephone). The Group III Facsimile Standards for encoding and compressing data are performed using the coding scheme known as the modified Huffman code. The modified Huffman code uses the standard Huffman code in conjunction with the modified READ (Relative Element Addressing Designate) code. Once the facsimile message is Group III encoded and compressed, it is transferred to the message controller 22 via the PSTN 24. The message controller 22 directs the message to a processor 20 for providing additional processing of the message suitable for selective call communication. After storing at least a portion of the information in a message memory 16, the processor 20 and the message controller 22 begin processing the information, as will be explained below.

According to the present invention, multiple Huffman code-books are used for coding and decoding fax messages. In order to more closely approximate run-length probabilities of an image to be compressed, Huffman code-books are designed separately for different types of images, e.g., handwriting, drawings, maps, etc., with different resolutions, e.g., 50 dots-per-inch (DPI), 100 DPI, etc. Training data from desired image types are collected, and the run-length probabilities for each type are approximated from the collected training data. Huffman code-books are then designed or existing code-books are chosen for each image type using the computed run-length probabilities. For certain applications, there may be more code-books than for other applications because the types of messages are more diversified.

The multiple code-books are stored in the code-book memory 50 at the paging terminal (preferably the site of the processor 20 and message controller 22 ). Alternatively, the processor 20 and code-book memory 50 is optionally part of the selective call terminal 28. In addition, the same code-books are stored in a memory of the fax selective call receiver 40. The code-books are stored with corresponding indexes (identifiers) in the code-book memory 50 and in the memory of the fax selective call receiver 40 so that they can be identified based on the index. The message controller 22 receives a compressed file from the fax machine 14, representing the image to be sent to the SCR 40.

For many applications, a facsimile message in a selective call receiver system is not long, For example, the fax message is significantly smaller than an 8½×11 typical fax document because the display screen is presently significantly smaller. Consequently, because the fax message is known to be smaller for certain applications, the code-books to compress and decompress such small images are relatively small. Hence, the code-books can be stored in memory of a portable device, such as a selective call receiver, without requiring an unduly large memory that would prohibitively raise the cost of the device. Furthermore, in these fax SCR applications, the variety of fax message images types are not typically extensive. Thus, optimal data compression can be achieved on the basis of a relatively small number of code-books.

Figure 2:
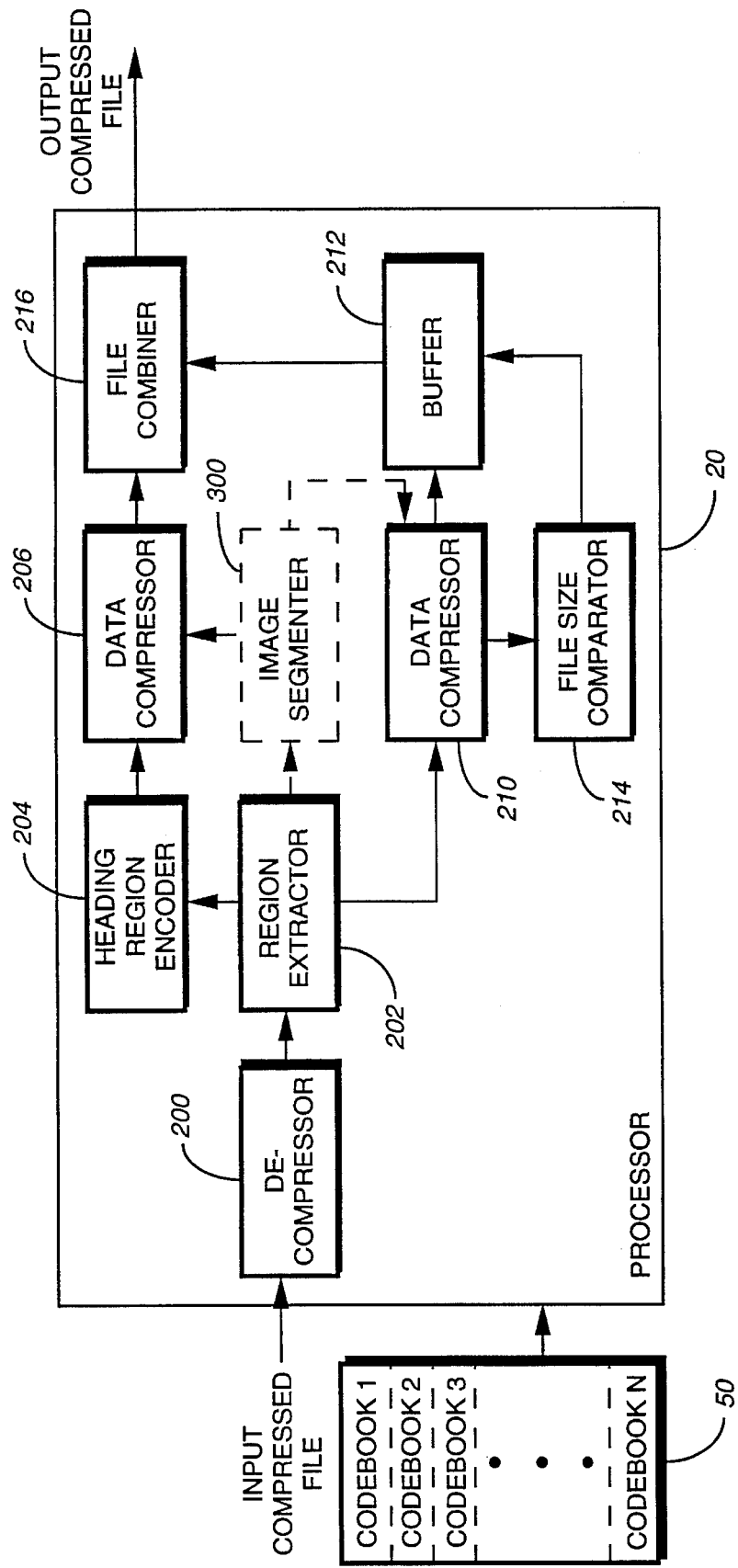
FIG. 2 is an electrical block diagram of a selective call terminal processor of the selective call communication system of FIG. 1 in accordance with the present invention.

FIG. 2 illustrates components of the selective call processor 20 which implements the multiple code-book compression of the present invention. The processor 20 includes a decompressor 200 which decompresses the compressed image sent by the fax machine 14. Preferably, after the image received from the fax machine 14 is decompressed, only that portion of the image lying in region 44 is subjected to the multiple-code book compression procedure. Other regions of the source document such as region 42 are, a priori, known to consist of a certain type of image, such as text identifying the name of the party to whom the message is addressed and the name of the sender of the message, which can be optimally compressed with a particular optimal code-book.

Accordingly, a region extractor 202 is provided to extract the various regions from the decompressed image, and supply the respective regions to the appropriate processing channel. In particular, the image portion in region 42 is extracted and encoded by a heading region encoder 204, and ultimately compressed by a data compressor 206 which uses a single code-book optimized for data in the region 42. The heading region encoder 204 is, for example, an ASCII based encoder, or for example, an encoder which translates "bubbles" in a fax message form, used to identify the selective call receiver destined to receiver the fax message. For purposes of the explaining the present invention, it need only be understood that portions of the source document are optionally encoded and compressed by means other than facsimile compression.

As shown in FIG. 2, the processor 20 comprises a main region data compressor 210, a buffer 212 and a file size comparator 214. The region extractor 202 supplies the image portion from the main region 44 to the data compressor 210 which compresses the main region image using each of the code-books stored in the code-book memory 50. As will be explained in greater detail in conjunction with FIGS. 5 and 6, the file size comparator 214 compares the file size of each compressed data file with the compressed data file for the previous code-book, and stores the smallest file in the buffer 212, together with the index of the code-book used to generate that file. The compressed data file representative of the image in the heading region 42 is combined with the data file representative of the main region 44 by the file combiner 216.

Figure 3:
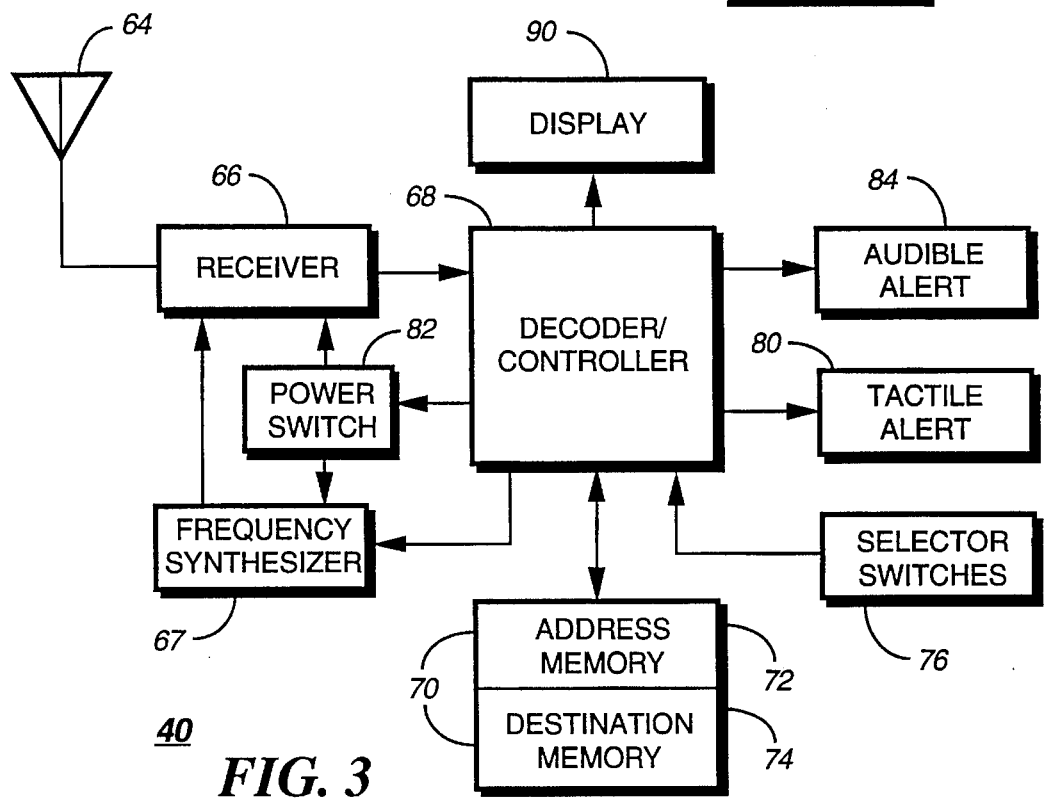
FIG. 3 is an electrical block diagram of a selective call receiver in accordance with the preferred embodiment of the present invention.

Referring to FIG. 3, an electrical block diagram of the selective call receiver 40 is shown in accordance with the preferred embodiment of the present invention. The selective call receiver 40 comprises an antenna 64 for intercepting transmitted radio frequency (RF) signals which is coupled to the input of a receiver 66. The receiver 66 provides for reception of transmissions on a single reception frequency, or reception on multiple reception frequencies. When multiple frequency reception is provided, a frequency synthesizer 67 enables the generation of the multiple reception frequencies in a manner well known to one of ordinary skill in the art. The receiver 66 receives and demodulates the transmitted signals, preferably frequency modulated data signals, providing at the output of the receiver a stream of binary data signals corresponding to the destination IDs transmitted from any particular destination location. The binary data signals are coupled into the input of a decoder/controller 68 which processes the signals, in a manner well known in the art. The received destination IDs are compared with the predetermined destination ID corresponding to the destination which the subscriber has preselected. A memory 70, coupled to the decoder/controller 68, includes a table of destination IDs, or addresses, which are stored in a destination memory 74 section of the memory 70. Selector switches 76 are provided to enable the selection of one or more destination addresses identifying destinations at which the subscriber wishes to be notified. A display 90 is used to display the destination information (composite information) stored in the destination memory 74 for enabling the subscriber to readily select the destination at which an alert is desired, as will be described below. The decoder/controller 68 compares the received destination IDs with the predetermined destination address selected by the subscriber from the destination memory 74, and when a match is detected, the decoder/controller 68 generates an alert enable signal which is coupled to the input of a sensible alerting device, such as the tactile alerting device 80. The tactile alerting device 80 preferably provides a silent vibratory output alerting the subscriber that the destination selected is being approached.

When the selective call receiver 40 is used to provide both destination notification alerting and paging capability including fax capability, the addresses assigned to the selective call receiver 40 for use in the selective call communication system are stored in an address memory 72 portion of memory 70. The decoder/controller 68 then controls the generation by the frequency synthesizer 67 of the selective call communication system's frequency or the paging system's frequency, to enable selectively receiving signals on a paging channel or the selective call system channel. A power switch 82 coupled to the decoder/controller 68 is used to control the supply of power to the receiver 66, thereby providing a battery saving function, as is well known in the art for use with selective call receivers. When the paging channel is selected, the received paging address signals are processed by the decoder/controller 68, and when a paging address signal is detected which corresponds to an assigned address of the selective call receiver 40, the decoder/controller 68 generates an alert enable signal which can be coupled to an audible alerting device 84, such as an audible transducer, to provide an audible alert, or can be coupled to the tactile alerting device 80 to provide a silent alert. Selection of either audible or silent alerting is provided by the selector switches 76 in a manner well known in the art.

Figure 4:
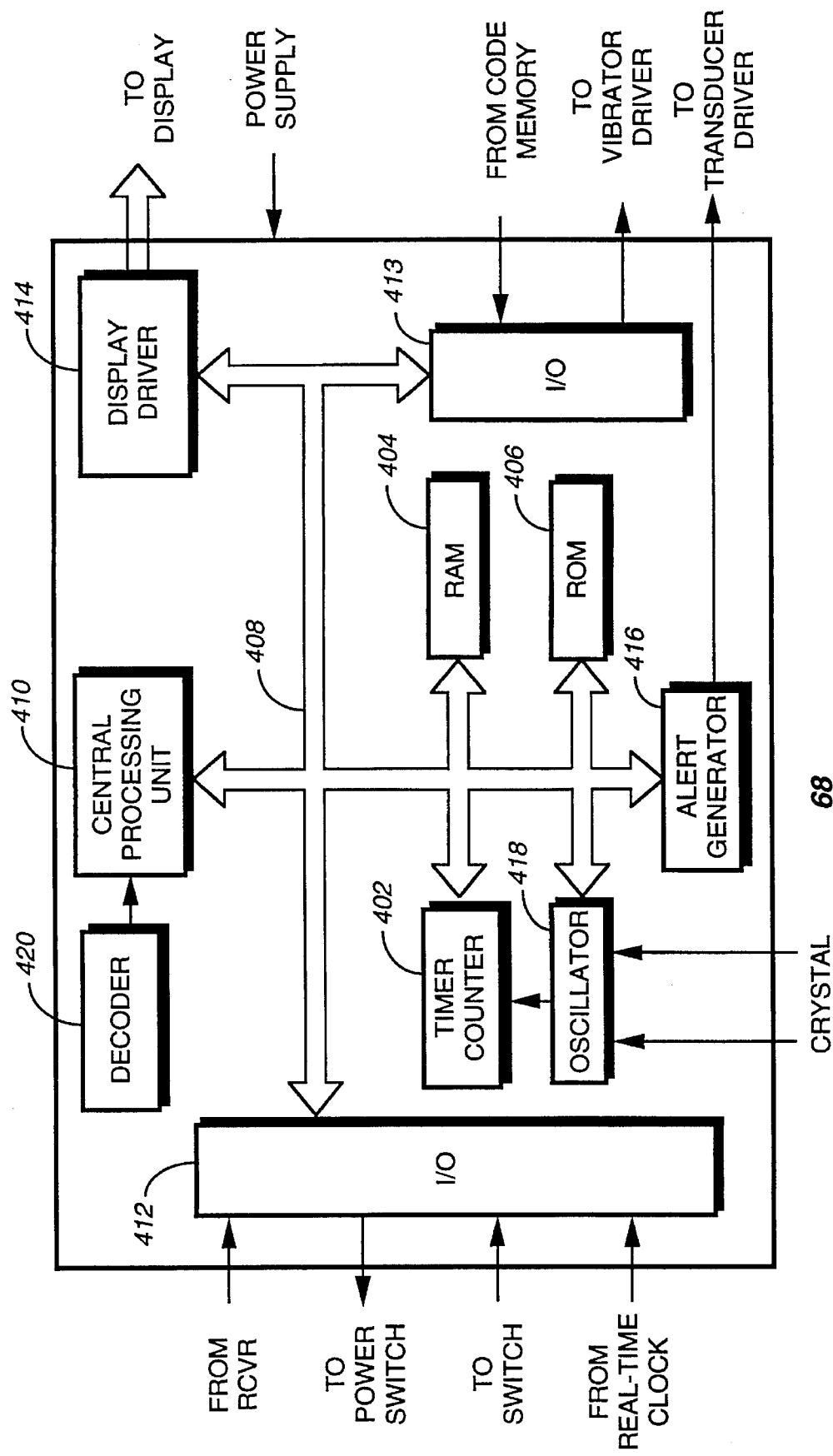
FIG. 4 is an electrical block diagram of a microcomputer based decoder/controller used in the selective call receiver of FIG. 3.

The controller/decoder 68 of FIG. 3 can be implemented utilizing a microcomputer as shown in FIG. 4. FIG. 4 is an electrical block diagram of a microcomputer based decoder/controller suitable for use in the selective call receiver of FIG. 3. As shown, the microcomputer 68 is preferably of the family of MC68HC05 series microcomputers, manufactured by Motorola, Inc., which includes an on-board display driver 414. The microcomputer 68 includes an oscillator 418 which generates the timing signals utilized in the operation of the microcomputer 68. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of composite fax paging information which are received during operation as a selective call receiver. A ROM (read only memory) 406 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to a central processing unit (CPU) 410 which performs the instructions and controls the operations of the microcomputer 68.

The demodulated data generated by the receiver is coupled into the microcomputer 68 through an input/output (I/O) port 412. The demodulated data is processed by the CPU 410 and when the received address is the same as that stored within the code-plug memory which couples into the microcomputer through, for example an I/O port 413, the selective call fax message is received and stored in RAM 404. The CPU 410 is coupled to at least one decoder 420 which decodes the encoded portion, if any, of the received file, such as the encoded image portion representative of the heading region, for example.

The RAM 404 temporarily stores the received compressed file, and decompression of the each portion of the composite information is performed, as will be explained in conjunction with FIG. 5. The compressed portion representative of the heading region 42 is decompressed using the appropriate code-book, known beforehand, by the CPU 410, and ultimately is combined with the decompressed image portion representative of the main region 44. Recovery of the stored message, and selection of the predetermined destination address, is provided by the switches which are coupled to the I/O port 412. The microcomputer 68 then recovers the stored message and directs the information over the data bus 408 to the display driver 414 which processes the information and formats the information for presentation by the display 90 (FIG. 3) such as an LCD (liquid crystal display).

When the selective call receiver 40 receives its address, the alert signal is generated which can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 413 to enable generation of a vibratory, or silent alert.

Figure 5:
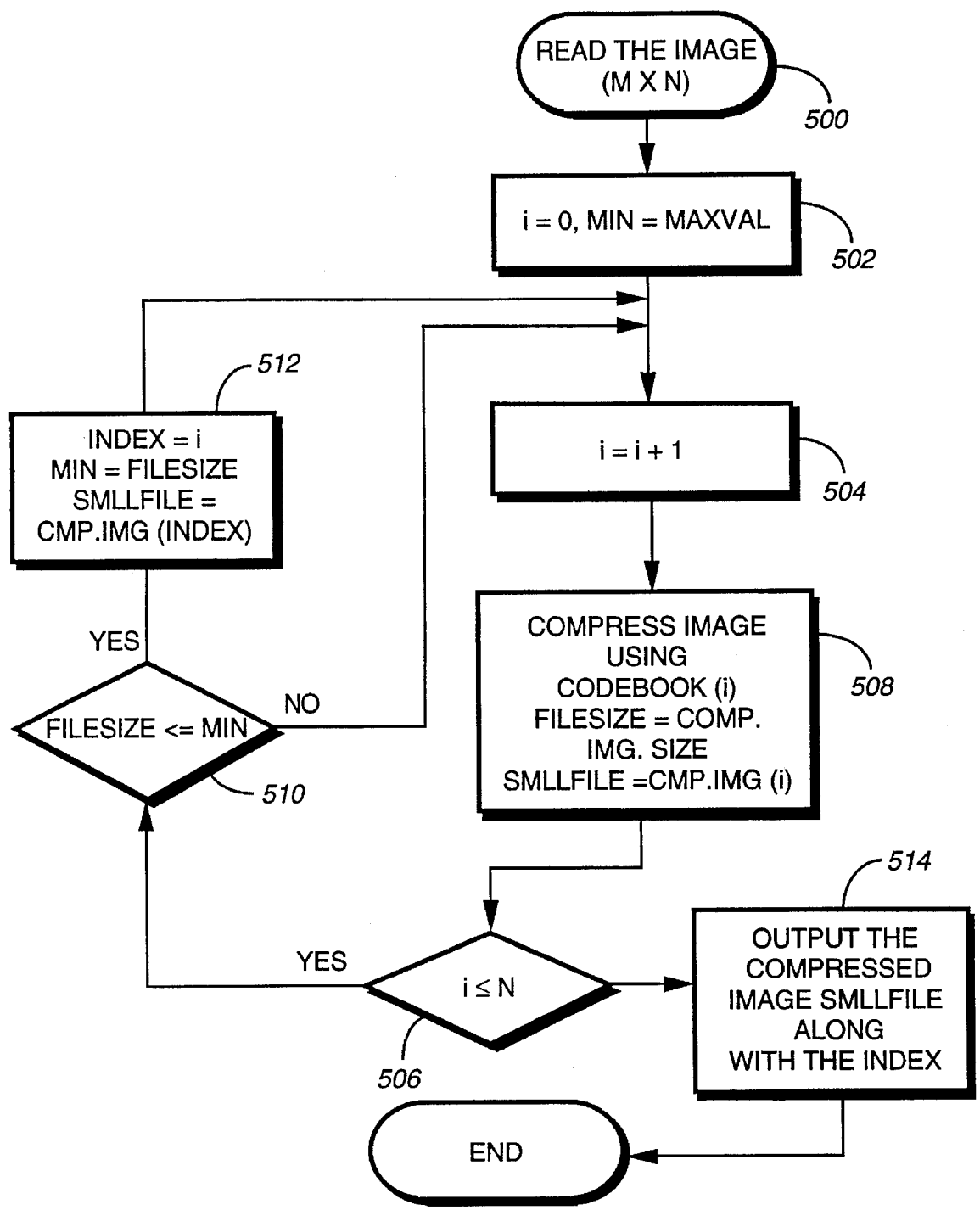
FIG. 5 is a flow diagram illustrating a procedure for generating a compressed data file representative of an image to be facsimile transmitted to a selective call receiver according to the present invention.

Turning now to FIG. 5, the procedure for compressing an image in the main region will be described. This procedure is carried out by the data compressor 210, buffer 212 and file size comparator 214, all shown in FIG. 2. In step 500, the encoded main region image portion extracted by the region extractor 202 is read from the main region encoder 206. Steps 502, 504 and 506 represent controls for the iterations of compressions performed in step 508 on the image by each of a plurality of code-books, accessed from the memory 50 and applied to the image with the index (i). In step 508, the size of the compressed image is determined and stored in the variable FILESIZE, and the compressed file itself is stored in the buffer variable SMLLFILE. Step 506 serves as a loop termination check, so that the loop is terminated once all of the code-books are applied to the image. The value of N controls termination of the loop consisting of steps 504, 508, 510 and 512, and is equal to the number of code-books.

In step 510, the value of FILESIZE is compared by the file size comparator 214 with the value of the variable MIN. The variable MIN is initially set in step 502 to some maximum value which is known to be greater than the largest possible file size resulting from compression of the image with any of the stored code-books. Thus, after the compression with the first code-book, the value of FILESIZE will be less than or equal to MIN, and consequently step 512 is reached.

In step 512, the value of FILESIZE is stored in MIN, the current value of the counter i is stored in the variable INDEX, and the compressed file CMP.IMG(INDEX) is stored in the array variable SMLLFILE. It should be clear that, after compression of image is made with each code-book, the value of INDEX will identify the code-book that resulted in the smallest compressed file, and the content of the array variable SMLLFILE represents the smallest compressed file. Step 514 outputs the most recent values of INDEX and SMLLFILE determined in step 512, which represent the smallest compressed file and the index of the code-book used to generate that file.

The procedure shown in FIG. 5 is preferably embodied as software which is executable by the processor 20. The processor 20 is, for example, a personal computer having conventional processing power, or a higher powered microprocessor based computer. One with ordinary skill in the art can design the software to implement this procedure based on the flow diagram of FIG. 5.

It should be understood that the results of the procedure of FIG. 5 consists of the smallest compressed file achievable with the stored code-books, for the image contained in the main image region 44. This data is combined with the compressed file representing data in other regions of the source document, and is ultimately embedded into a GSC or POCSAG paging protocol signal and transmitted to the appropriate selective call receiver.

Figure 6:
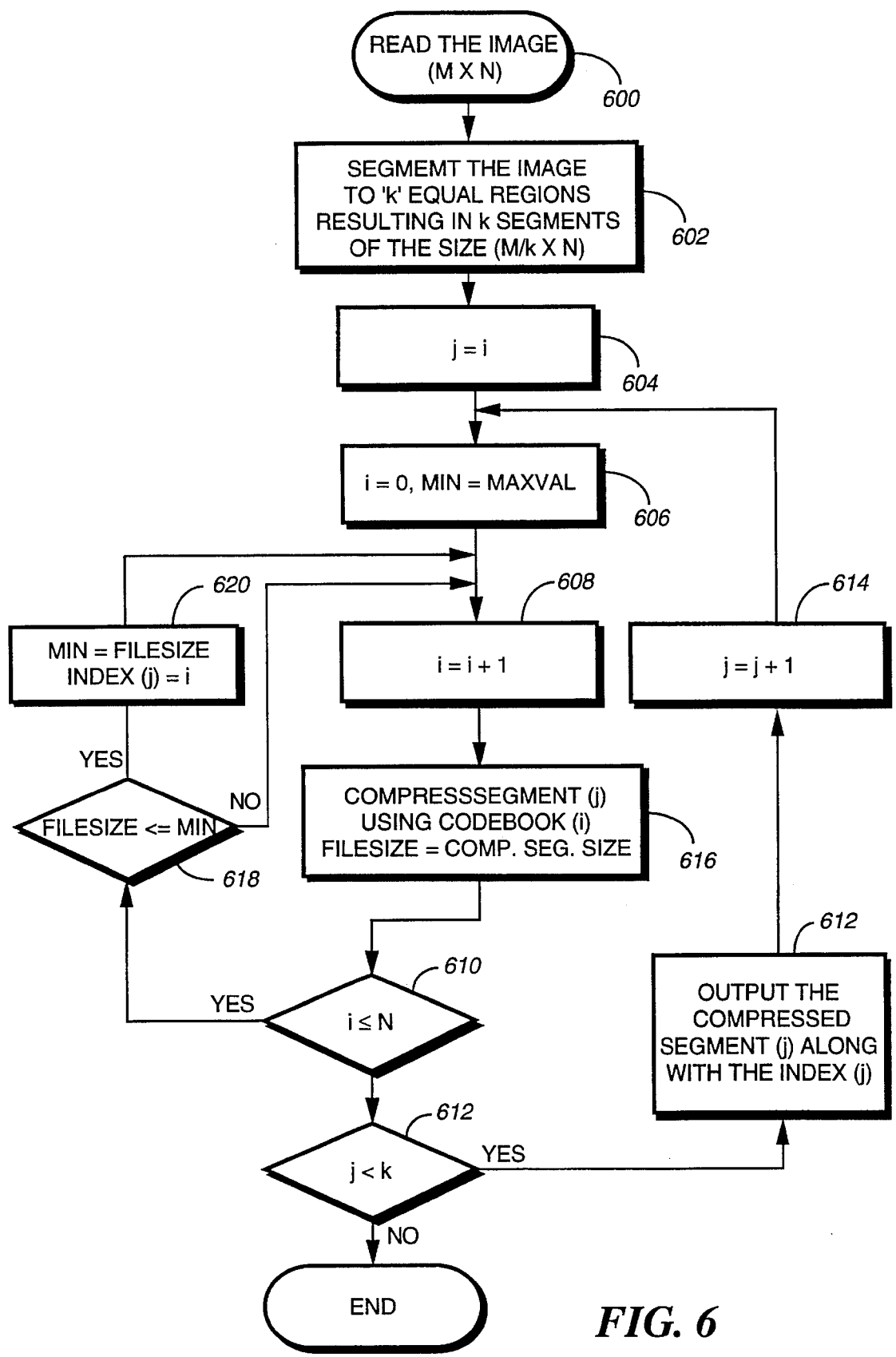
FIG. 6 is a flow diagram illustrating another procedure for generating a compressed data file representative of an image to be facsimile transmitted to a selective call receiver according to an alternative embodiment of the present invention.

Turning now to FIGS. 6, 7, 8 and 9, the alternative embodiment of the present invention will be described. FIG. 6 illustrates a procedure for generating the smallest compressed file in accordance by dividing the image, preferably the image in the main region, into a plurality of sub-images or image segments and applying each of the stored code-books to each sub-image to determine the best code-book for each sub-image. The sub-images are generated by an image segmenter 300 shown in phantom in FIG. 2.

Figure 7:
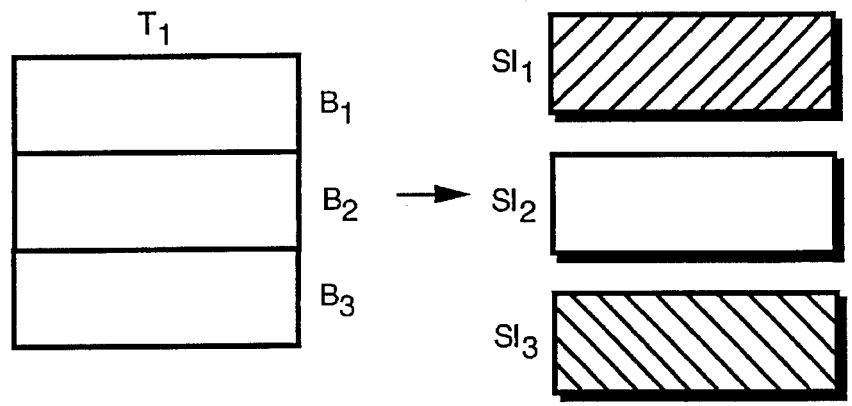
FIGS. 7, 8 and 9 are pictorial representations illustrating an example of the procedure of FIG. 6.
Figure 8:
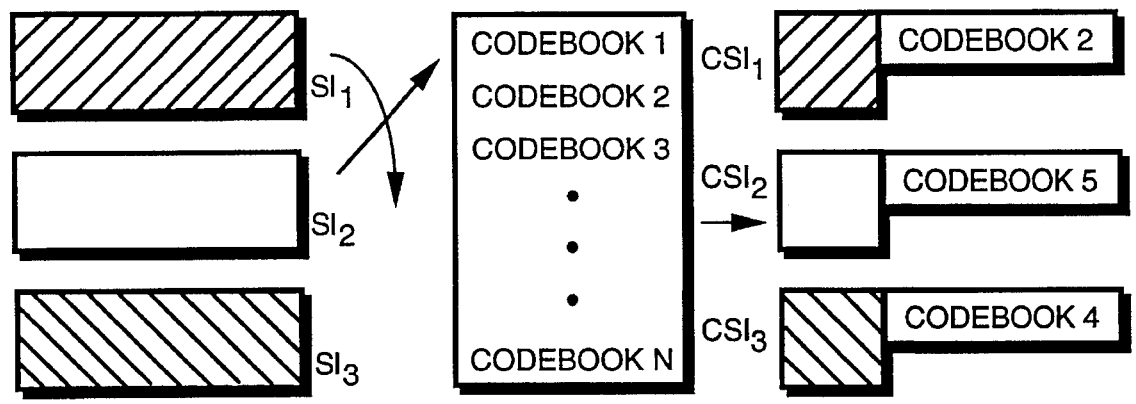
Figure 9:
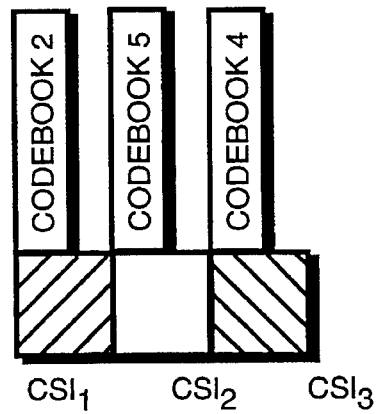

FIGS. 7, 8 and 9 pictorially depict the procedure of this embodiment. As shown in FIG. 7, the image is divided into several sub-images SI1, SI2 and SI3, according a template T with predetermined boundaries B1, B2 and B3. Next, as shown in FIG. 8, each sub-image is compressed using each of the code-books and the best code-book (smallest size of resulting compressed file CSI1, CSI2 and CSI3) is determined for each sub-image. Finally, as shown by FIG. 9, the compressed files CSI1, CSI2 and CSI3, together with their corresponding code-book index, are combined for transmission in a GSC or POCSAGG paging protocol signal to a selective call receiver.

Referring now to FIG. 6, the procedure according to the alternative embodiment is shown. The procedure is an extension of the one shown in FIG. 5, to account for compressing each of the sub-images with each of the code-books. It is to be understood that one with ordinary skill in the art can design software to implement the procedure depicted by the flow diagram of FIG. 6.

In step 602, segmentation of the image is made by the image segmenter 300 (FIG. 2) into 'k' sub-images of 'k' equal regions. To one with ordinary skill in the art, it should be apparent that steps 604, 606, 608, 610, 612 and 614 are loop initiation and control steps. In step 616, each sub-image is compressed using each code-book, and the size of the resulting file is stored in the variable FILESIZE. Steps 618 and 620 are similar to steps 510 and 512 in FIG. 5. After each sub-image is compressed with each code-book, each compressed sub-image or segment(j) is output together its corresponding code-book index, INDEX(j) in step 613.

The compressed files generated by the procedures of the preferred and alternative embodiments are extracted and received by a selective call receiver from a paging protocol signal. The compressed files are decompressed in order to display the image on the display of the selective call receiver.

Figure 10:
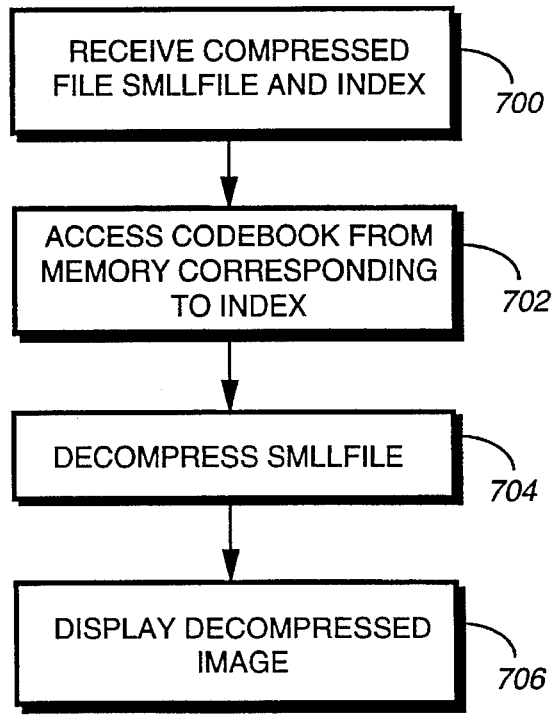
FIG. 10 is a flow diagram illustrating a procedure for receiving and decompressing a facsimile data file generated in accordance with the embodiment illustrated in FIG. 5.

FIG. 10 illustrates the flow diagram for a procedure to decompress the compressed data file in the selective call receiver 40, which was generated and transmitted in accordance with the preferred embodiment. In step 700, the compressed file SMLLFILE is received together with INDEX. The memory 404 (FIG. 4) is accessed in step 702 to obtain the code-book corresponding to the value of INDEX. Next, in step 704, SMLLFILE is decompressed using the code-book corresponding to INDEX. Finally, in step 706, the decompressed image is displayed on the display of the selective call receiver. It should be appreciated that in step 706, compressed images from other regions other than the main region 44 of the source document, are optionally combined with the decompressed image for the main region.

Figure 11:
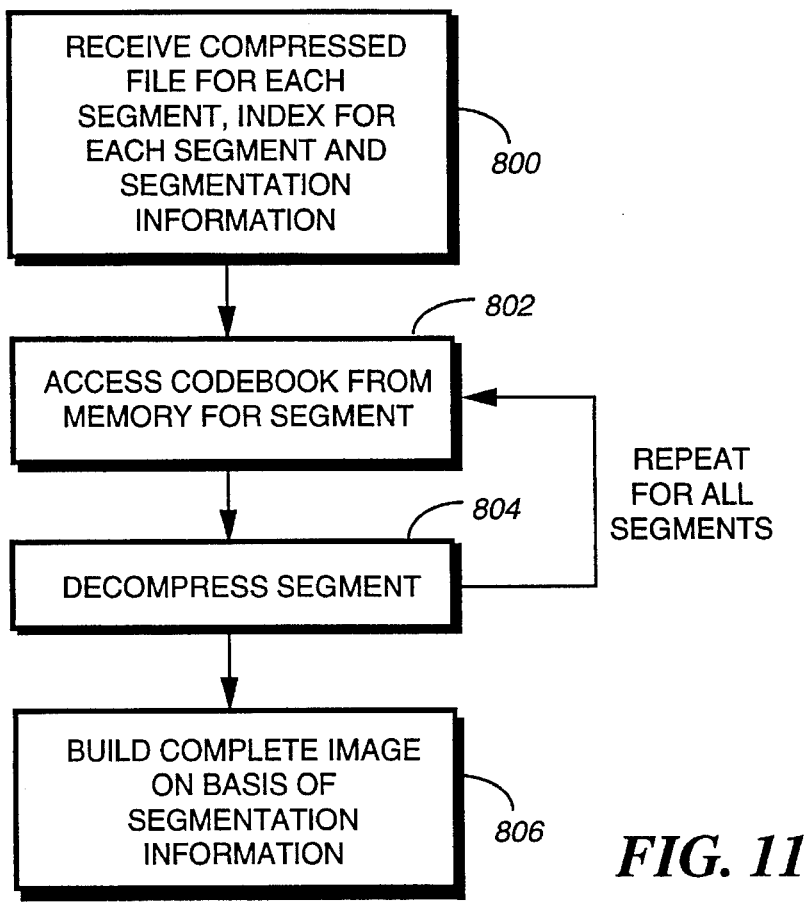
FIG. 11 is a flow diagram illustrating a procedure for receiving and decompressing a data file generated in accordance with the embodiment illustrated in FIG. 6.

FIG. 11 is the flow diagram for the procedure to decompress each of the sub-images in the selective call receiver 40, which were generated in accordance with the alternative embodiment. In step 800, the compressed files for each sub-image and the corresponding index is received, together with segmentation information indicating how the larger image was segmented. In steps 802 and 804 the sub-images are sequentially decompressed using the appropriate code-book. The memory 404 of the selective call receiver is accessed to obtain the code-book for the sub-image in step 802, and in step 804, the sub-image is decompressed using that code-book. Steps 802 and 804 are repeated until all of the sub-images are decompressed. Finally, in step 806, the complete image is built on the basis of the segmentation information, and the image is displayed on the display of the selective call receiver display.

Figure 12:
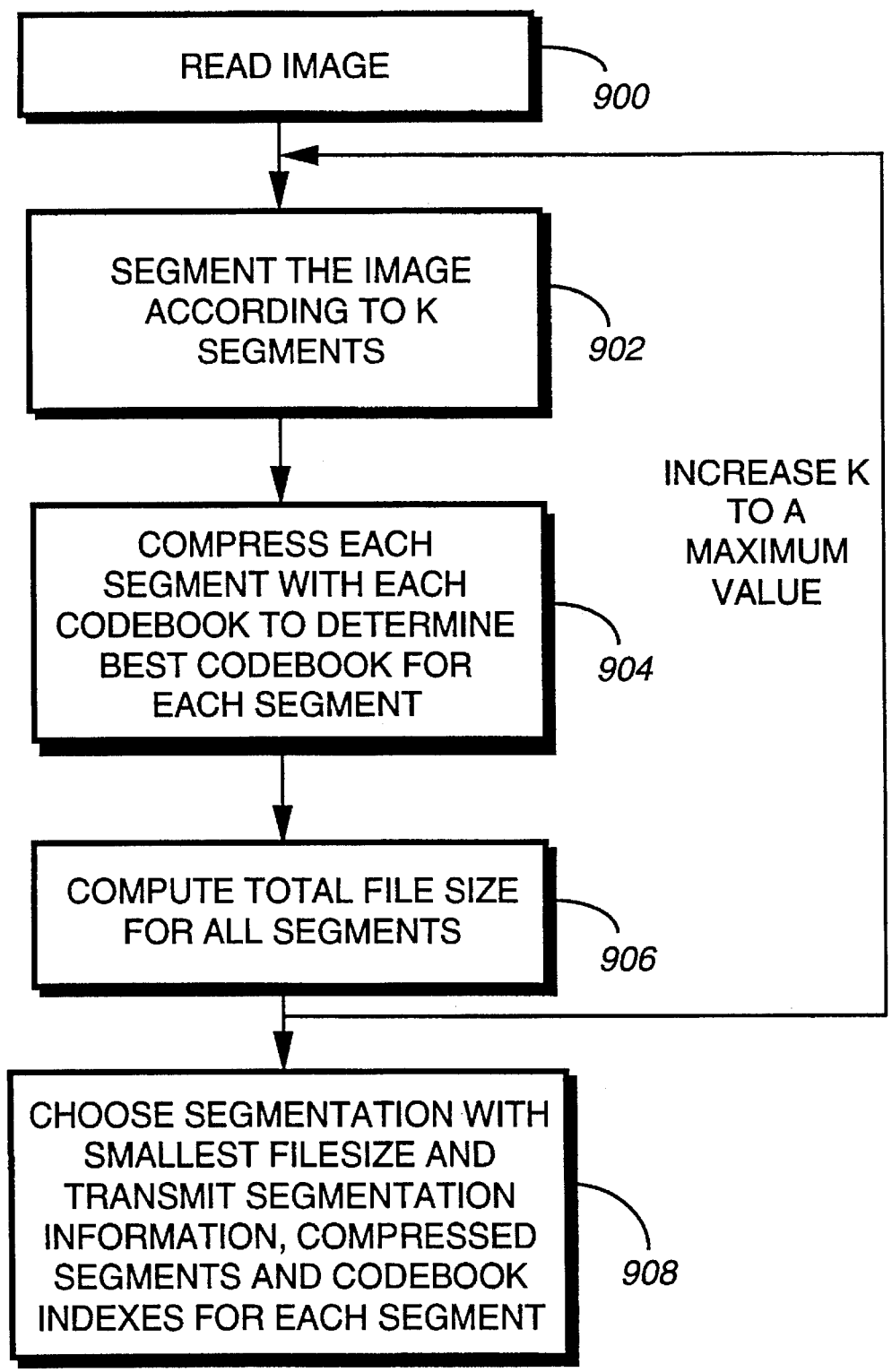
FIG. 12 is a flow diagram illustrating a procedure for generating a compressed data file in accordance with yet a further alternative embodiment of the present invention.

FIG. 12 illustrates a modification to the alternative embodiment to allow for multiple ways of dividing or segmenting the image, ultimately to generate the smallest compressed file. In FIG. 2, the image transmitted by fax machine 14 is read in step 900. In step 902, the image is segmented into 'k' segments. The value of 'k' is initially small, for example 3 or 4. Each sub-image or segment is compressed with each code-book in step 904 and the best code-book for each segment is determined, based on resulting file size. In step 906, the cumulative file size for compressing all of the sub-images of that segmentation is determined. The value of 'k' is increased and steps 902, 904 and 906 are repeated. A maximum value of 'k' is set based on the typical size and types of images expected to be transmitted, and the size of the display of the selective call receiver 40. In step 908, the segmentation with the smallest cumulative file size is chosen as the optimal segmentation, and the compressed sub-images, their corresponding code-book indexes, and the segmentation information (the value of 'k' and other information indicating the dimensions of the optimal segmentation) are transmitted by way of a paging protocol signal to the selective call receiver.

In order to decompress the variably segmented sub-images, the selective call receiver must detect the segmentation information in the transmitted signal, which is shown at step 800 in the decompression procedure of FIG. 11.

Another variation in accordance with the present invention is to segment the entire source document in a predetermined manner such that a predetermined optimal and fixed code-book is used for certain regions of the source document, such as the header, and other regions, such as the main region, is variably segmented and the best code-book is determined for each segment to determine the best overall segmentation method and permutation of code-books for the main region. Thus, regions where it is known, a priori, will consist only of certain types of images, can be pre-assigned optimal code-books, while for other regions, where the types of images are not known, a priori, can be adaptively assigned optimal code-books.

Based on the foregoing description, it should be apparent that the present invention is advantageous in certain applications, such as a facsimile SCR system, wherein the messages are compressed in a fixed call terminal station where computing power to compress the messages is abundant. Therefore, there is no significant time delay in performing the data compression with each of a plurality of code-books in the call terminal station. In the portable SCR, for reasons of cost, size, etc., a processor with less computing power is usually chosen, but this is not disadvantageous because the processor in the SCR is decompressing the transmitted file only once, with the code-book corresponding to the transmitted code-book identifier. Consequently, the present invention does not burden the processor of the portable unit any more than other fax messaging decompression methods.

The above description is intended by way of example only and is not intended to limit the present invention in an way except as set forth in the following claims.

What is claimed is:

1. In a selective call receiver fax messaging system, a method of compressing a fax message and transmitting the fax message to a selective call receiver where a compressed fax message is decompressed for output, the method comprising steps of:

generating multiple segmentation orientations of at least a portion of the fax message, each segmentation orientation comprising a plurality of segments;

compressing each of the segments of said portion in each of the multiple segmentation orientations with each of a plurality of different code-books;

determining a best compression and corresponding optimal code-book for each segment in each of the segmentation orientations;

transmitting to the selective call receiver at least a data file representing the best compression of said portion of the fax message together with an identifier which identifies an optimal code-book corresponding to the best compression;

receiving the data file at the selective call receiver;

identifying the code-book used to compress the data file on the basis of the identifier;

decompressing the data file with the code-book corresponding to the identifier received by the selective call receiver.

2. The method of claim 1, and further comprising the step of storing said plurality of code-books in a memory of the selective call receiver.

3. The method of claim 1, and further comprising the step of displaying the fax message on a display of the selective call receiver.

4. The method of claim 1, wherein said step of determining comprises selecting as the optimal code-book the code-book which results in the smallest compressed file.

5. The method of claim 4, wherein the step of determining comprises comparing the file size of the compressed files resulting from each code-book.

6. The method of claim 5, wherein said step of determining comprises selecting as the optimal code-book for each segment the code-book which results in the smallest compressed file for each segment.

7. The method of claim 6, wherein the step of determining comprises comparing the file size of the compressed files of each segment resulting from each code-book.

8. The method of claim 1, wherein the step of determining comprises selecting an optimal segmentation orientation based on the segmentation orientation with the cumulative smallest file size, and determining the identifier of each optimal code-book for each segment of the optimal segmentation orientation.

9. The method of claim 1, wherein the step of transmitting further comprises transmitting information identifying the optimal segmentation orientation.

10. A selective call fax messaging system for communicating with a plurality of fax selective call receivers, comprising;

a selective call terminal for wirelessly transmitting selective call messages to the selective call receivers, the selective call terminal comprising:

a message controller for receiving fax messages from a fax transmitter, a selective call processor for generating selective call fax messages for transmission to at least one selective call receiver, a codebook memory for storing a plurality of facsimile code-books;

the selective call processor comprising an image segmenter generating multiple segmentation orientations of the portion of the fax message, each segmentation orientation comprising a plurality of segments; a data compressor coupled to the image segmenter and compressing each segment in each of the multiple segmentation orientations of said portion of the fax message; a file size comparator coupled to the data compressor and determining a best compression for said portion of the fax message from said plurality of code-books; and a file combiner coupled to the data compressor and generating at least a data file representing a best compression and identifier of the corresponding optimal codebook for each segment in each of the segmentation orientations;

said selective call receiver comprising:

a receiver for receiving the data file;

a processor for identifying the code-book used to compress the data file and decompressing the data file with the code-book corresponding to the identifier.

11. The system of claim 10, wherein said selective call receiver comprises a memory storing said plurality of code-books.

12. The system of claim 10, wherein the selective call receiver further comprises a display displaying the fax message.

13. The system of claim 10, wherein said file size comparator selects as an optimal code-book the code-book which results in the smallest compressed file.

14. The system of claim 1o, wherein said file size comparator selects an optimal segmentation orientation based on the segmentation orientation with the cumulative smallest file size, and determines the identifier of each optimal code-book for each segment of the optimal segmentation orientation.

* * * * *

UNITED STATES PATENT AND TRADEMARK OFFICE
CERTIFICATE OF CORRECTION

PATENT NO : 5,566,001
DATED : October 15, 1996
INVENTOR(S): Saidi et al.

It is certified that error appears in the above-identified patent and that said Letters Patent is hereby corrected as shown below:

Column 12, line 43, change "lo" to --10--.

Signed and Sealed this

Fourteenth Day of December, 1999

Attest:

Attesting Officer

Q. TODD DICKINSON

Acting Commissioner of Patents and Trademarks